US007743221B2

(12) United States Patent
Chen et al.

(10) Patent No.: US 7,743,221 B2
(45) Date of Patent: Jun. 22, 2010

(54) MEMORY SHARING METHOD FOR SHARING SRAM IN AN SOC DEVICE

(75) Inventors: Chih-Ching Chen, Chia-Yi Hsien (TW); Li-Chun Tu, Taipei (TW)

(73) Assignee: MediaTek Inc., Hsin-Chu (TW)

( * ) Notice: Subject to any disclaimer, the term of this patent is extended or adjusted under 35 U.S.C. 154(b) by 738 days.

(21) Appl. No.: 11/625,349

(22) Filed: Jan. 22, 2007

(65) Prior Publication Data

US 2008/0005491 A1 Jan. 3, 2008

Related U.S. Application Data

(60) Provisional application No. 60/806,478, filed on Jul. 3, 2006.

(51) Int. Cl.
*G06F 12/02* (2006.01)

(52) U.S. Cl. .................... 711/153; 711/147; 711/173

(58) Field of Classification Search ............... 711/153, 711/147, 173
See application file for complete search history.

(56) References Cited

U.S. PATENT DOCUMENTS 4,550,368 A * 10/1985 Bechtolsheim ............... 711/206
5,535,364 A * 7/1996 Resman et al. .............. 711/151

* cited by examiner

*Primary Examiner*—Sanjiv Shah
*Assistant Examiner*—Jae U Yu
(74) *Attorney, Agent, or Firm*—Winston Hsu

(57) ABSTRACT

A memory sharing method for at least a functional module and a target module is disclosed. The functional module includes at least a static random access memory (SRAM), the memory sharing method includes the steps of calculating a memory capacity of the functional module; if a total memory capacity of a module group satisfies a memory capacity requirement of the target module, allocating the SRAM of the module group, wherein the module group comprises at least one functional module; and accessing the SRAM of the functional module of the module group by utilizing the target module.

18 Claims, 11 Drawing Sheets

MEMORY SHARING METHOD FOR SHARING SRAM IN AN SOC DEVICE

CROSS REFERENCE TO RELATED APPLICATIONS

This application claims the benefit of U.S. provisional application No. 60/806,478, which was filed on 2006 Jul. 3 and is included herein by reference.

BACKGROUND

The present invention relates to memory sharing, more particularly, to a memory sharing method for sharing SRAMs with a plurality of functional modules in a SOC device.

The evolution of system-on-chip (SOC) device greatly decreases the manufacture cost of electronic devices. However, the cost is still high for manufacturer since SOC device comprises several functional modules which comprise the corresponding memories. The total memories in an SOC device occupy substantial chip area of the SOC device. For example, internal memory blocks may occupy as much as about 70% area of an SOC device.

In related art SOC devices, a static random access memory (SRAM) is generally assigned for each functional module in each SOC device. The memory allocation depends on the features of the functional modules, such as the required memory size and data bits. Furthermore, each SRAM includes a number of memory cells where each memory cell typically stores one bit of information.

A problem that arises in the SOC device of this type is that the SRAMs distributed in different functional modules generally are not accessed simultaneously, thereby causing idle SRAMs to remain unused. Therefore, it is evident that an enhanced mechanism to reallocate the SRAMs for functional modules is needed. This will help improve the utilization of the implemented SRAMs.

Similarly, the sharing of SRAMs by the functional modules in an SOC device should be considered early on the allocation design of SRAMs. For an SOC device, modification of the access instructions and the associated controlling mechanism for the SRAMs is capable of reducing the total SRAM quantity and hence lower production costs.

SUMMARY

An objective of the present invention is to therefore provide a memory sharing method applied to an SOC device to reduce the number of implemented SRAMs and thereby reduce production costs.

According to an embodiment of the present invention, a memory sharing method for at least a functional module and a target module is disclosed. The functional module comprises at least a static random access memory (SRAM), the memory sharing method comprises: calculating a memory capacity of the functional module; if a total memory capacity of a module group satisfies a memory capacity requirement of the target module, allocating the SRAM of the module group, wherein the module group comprises at least one functional module; and accessing the SRAM of the functional module of the module group by utilizing the target module.

These and other objectives of the present invention will no doubt become obvious to those of ordinary skill in the art after reading the following detailed description of the preferred embodiment that is illustrated in the various FIGS and drawings.

DETAILED DESCRIPTION

The following description contains certain terms used throughout which refer to specific system components. As one skilled in the art will appreciate, consumer electronic equipment manufacturers can refer to a certain component through different names. This document does not intend to distinguish between components that differ in name, but only in function. In the following discussion and claims section, the terms "including" and "comprising" are used in an open-ended fashion, and thus should be interpreted to mean "including, but not limited to . . .". Also, the term "couple" or "couples" is intended to mean either an indirect or direct electrical connection. Thus, if a first device couples to a second device, that connection may be through a direct electrical connection, or through an indirect electrical connection via another device or connection.

Figure 1:
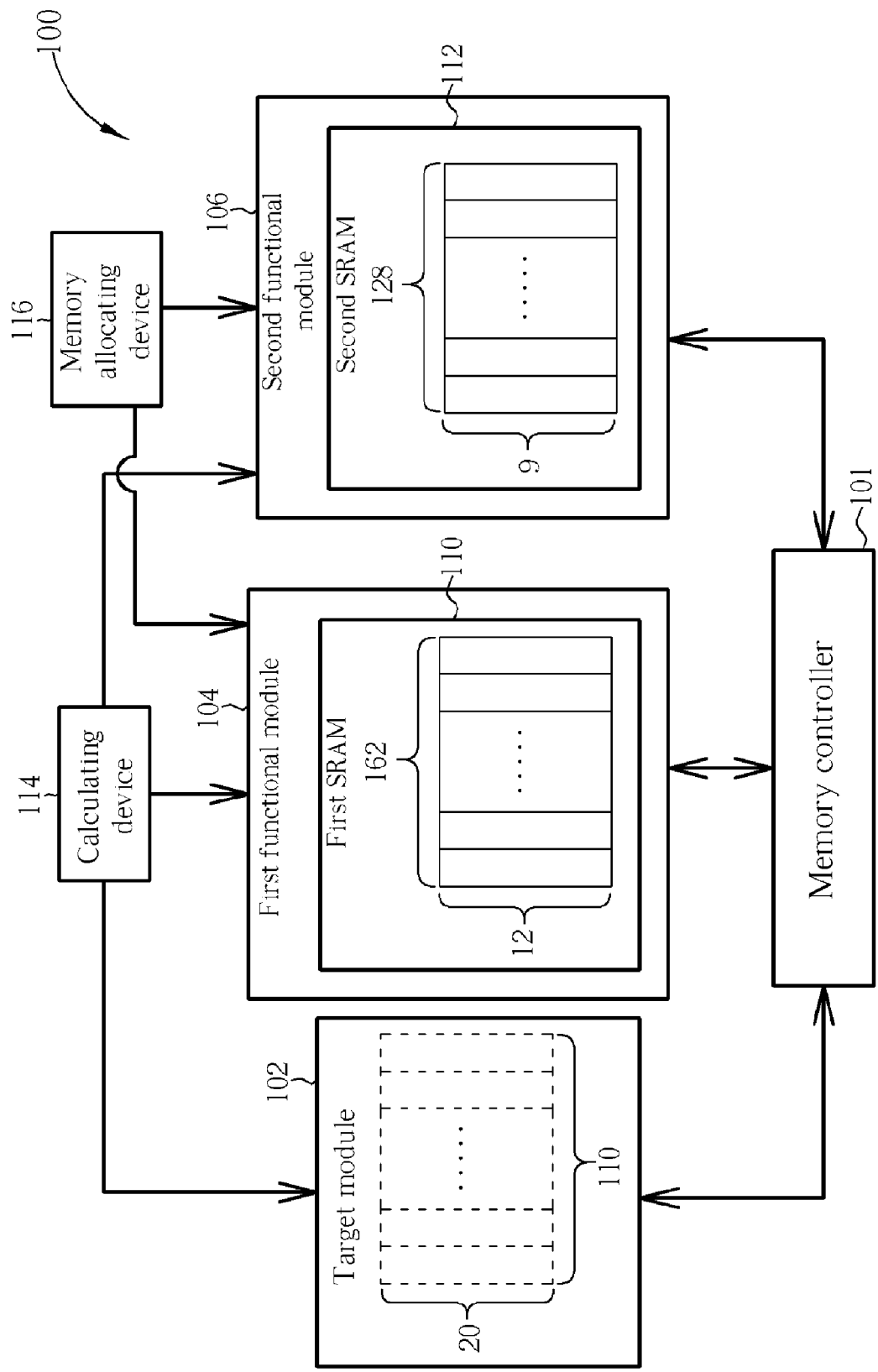
FIG. 1 illustrates a memory sharing system for two functional modules and a target module in an SOC device according to a first embodiment of the present invention.

FIG. 1 illustrates a memory sharing system 100 for at least a functional modules (i.e. two functional modules 104, 106 in this embodiment for brevity) and a target module 102 in an SOC device according to a first embodiment of the present invention. The first functional module 104 comprises a first static random access memory (SRAM) 110, and the second functional module 112 comprises a second SRAM 112. The memory sharing system 100 comprises a calculating device 114, a memory allocating device 116, and a memory controller 101. The calculating device 114 calculates a memory capacity of the functional modules 104, 106. The memory allocating device 116 allocates the SRAM of a module group if a total memory capacity of the module group satisfies a memory capacity requirement of the target module 102, wherein the module group comprises at least one functional module. The memory controller 101 accesses the SRAM of the functional module of the module group. Please note that, in order to describe the spirit of the present invention more clearly, the module group only includes the above-mentioned first and the second functional modules 104, 106 in this embodiment. However, in another embodiment, the module group can includes the target module 102, the first and the second functional modules 104, 106. The memory capacity of each SRAM comprises a cell number equal to a product of the number of addresses and number of data bits. In this embodiment, the target module 102 has no internal SRAM assigned within, and the memory controller 101 is implemented to allow the target module 102 to share the first SRAM 110 and the second SRAM 112, respectively allocated to first functional module 104 and second functional module 106. Please note that the number of implemented modules and the number of SRAMS illustrated are only for exemplary purposes. More specifically, the present invention is not limited to sharing only two SRAMS with one target module. The operation of memory sharing is detailed using an example below.

Please refer to FIG. 1 again, in normal operational mode of the SOC device, the target module 102 requires a memory capacity of (110*20), while first functional module 104 requires a memory capacity of (162*12), and second functional module 106 requires a memory capacity of (128*9). The referenced values of 110, 162, and 128 are the respective address numbers, while the values 20, 12, and 9 are the respective data bit numbers. Furthermore, the target module 102, first functional module 104, and second functional module 106 are not activated simultaneously.

In order to make sure that the total memory capacity within the first functional module 104 and the second functional module 106 is conformed to the memory capacity requirement of the target module 102, the calculating device 114 calculates the memory capacities of the first SRAM 110 and the second SRAM 112, which are 162*12 and 128*9 respectively, and obtains that the total memory capacity is 162*12+128*9. Then, the calculating device 114 compares the required memory capacity 110*20 of the target module 102 with the total memory capacity 162*12+128*9, and obtains that the total memory capacity 162*12+128*9 is not less than the required memory capacity 110*20, i.e. (162*12+128*9)≧110*20. Therefore, the memory sharing method of the present invention can be proceed upon the memory sharing system 100 since the total memory capacity within the first functional module 104 and the second functional module 106 is conformed to the memory capacity requirement of the target module 102.

Then, the calculating device 114 further calculates the address numbers and data bit numbers of both the first SRAM 110 and the second SRAM 112 respectively in order to decide a memory sharing mechanism of the present invention upon the memory sharing system 100. Since the address numbers of both the first and second functional modules 104, 106 are greater than 110, the data bit number of both functional modules 104, 106 are less than 20, and the sum of data bit numbers of both functional modules are not less than 20 (i.e. 12+9=21), which means that the data of the target module 102 can be directly accessed to the first SRAM 110 and the second SRAM 112 when the first and second functional modules 104, 106 are not activated. Therefore, the allocating device 116 allocates the first SRAM 110, which is a single memory chip and having the memory capacity of (162*12), to the first functional module 104, and allocates the second SRAM 112, which is also a single chip and having the memory capacity of (128*9), to the second functional module 106.

However, when both the first and second functional modules 104, 106 are inactive, the SOC device activates the target module 102 and the memory controller 101, and then enables the memory sharing mechanism.

Figure 2:
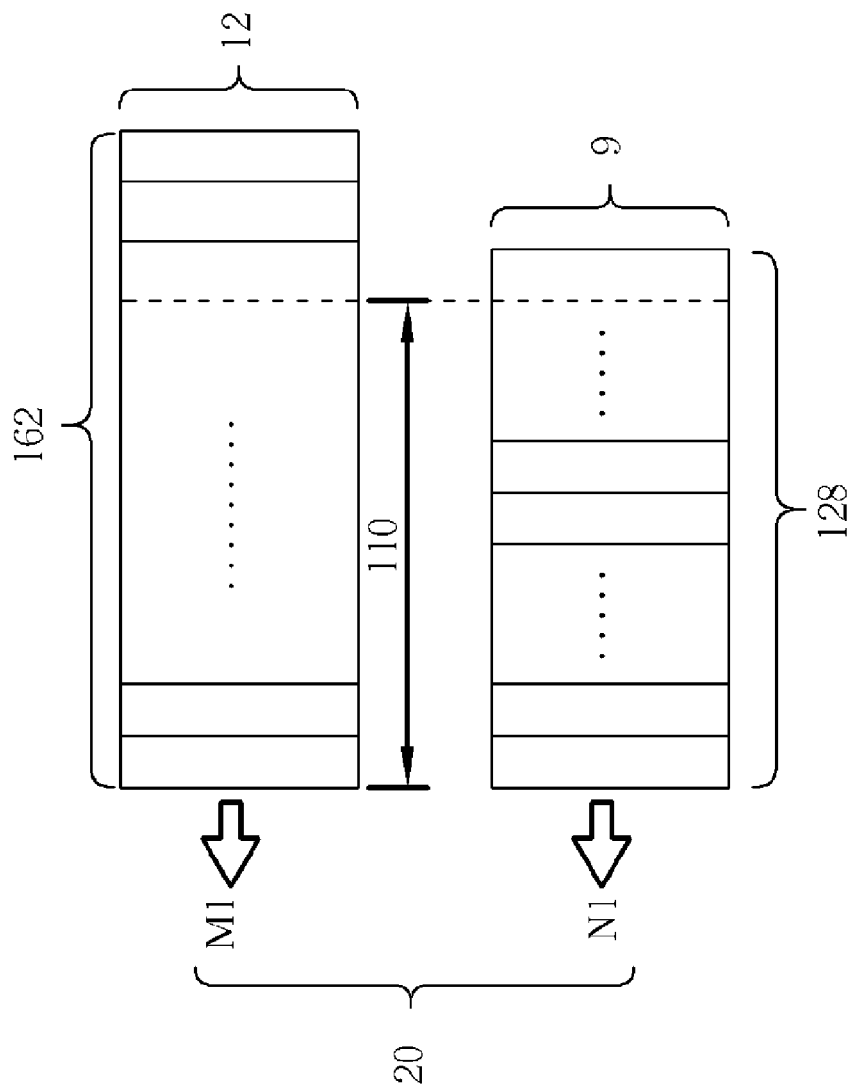
FIG. 2 is a diagram illustrating a memory sharing configuration for the target module as shown in FIG. 1.

Please refer to FIG. 2. FIG. 2 is a diagram illustrating a memory sharing configuration for the target module 102 shown in FIG. 1. As described above, the operation of the target module 102 requires a memory capacity of (110*20), where each of 110 addresses corresponds to 20 data bits. The memory controller 101 virtually merges the first SRAM 110 and second SRAM 112 to provide a suitable memory capacity required from the target module 102 as shown in FIG. 2. In this embodiment, the memory controller 101 directly passes an address requested by target module 102 to both the first and second SRAMs 110, 112 for accessing M1 data bits (e.g. 12 data bits) and N1 data bits (e.g. 8), respectively. It should be noted that the sum of M1 and N1 (i.e, M1+N1) is equal to 20. Furthermore, depending on design requirements, the values of M1 and N1 are programmable, while the data bits selected for sharing with target module 102 are programmable as well. In other words, under the condition of M1+N1=20, any M1 data bits can be chosen out of the first SRAM 110 of the first functional module 104 and any N1 data bits can be chosen out of the second SRAM 112 of the second functional module 106. For instance, 15 data bits can be selected from any portion of the first SRAM 110 of the first functional module 104, and another 5 data bits can be selected from any portion of the second SRAM 112 of the second functional module 106 in response to a specific address request by the target module 102. As a result, the target module 102, having no internal SRAM allocation, can operate normally through the memory sharing mechanism.

Figure 3:
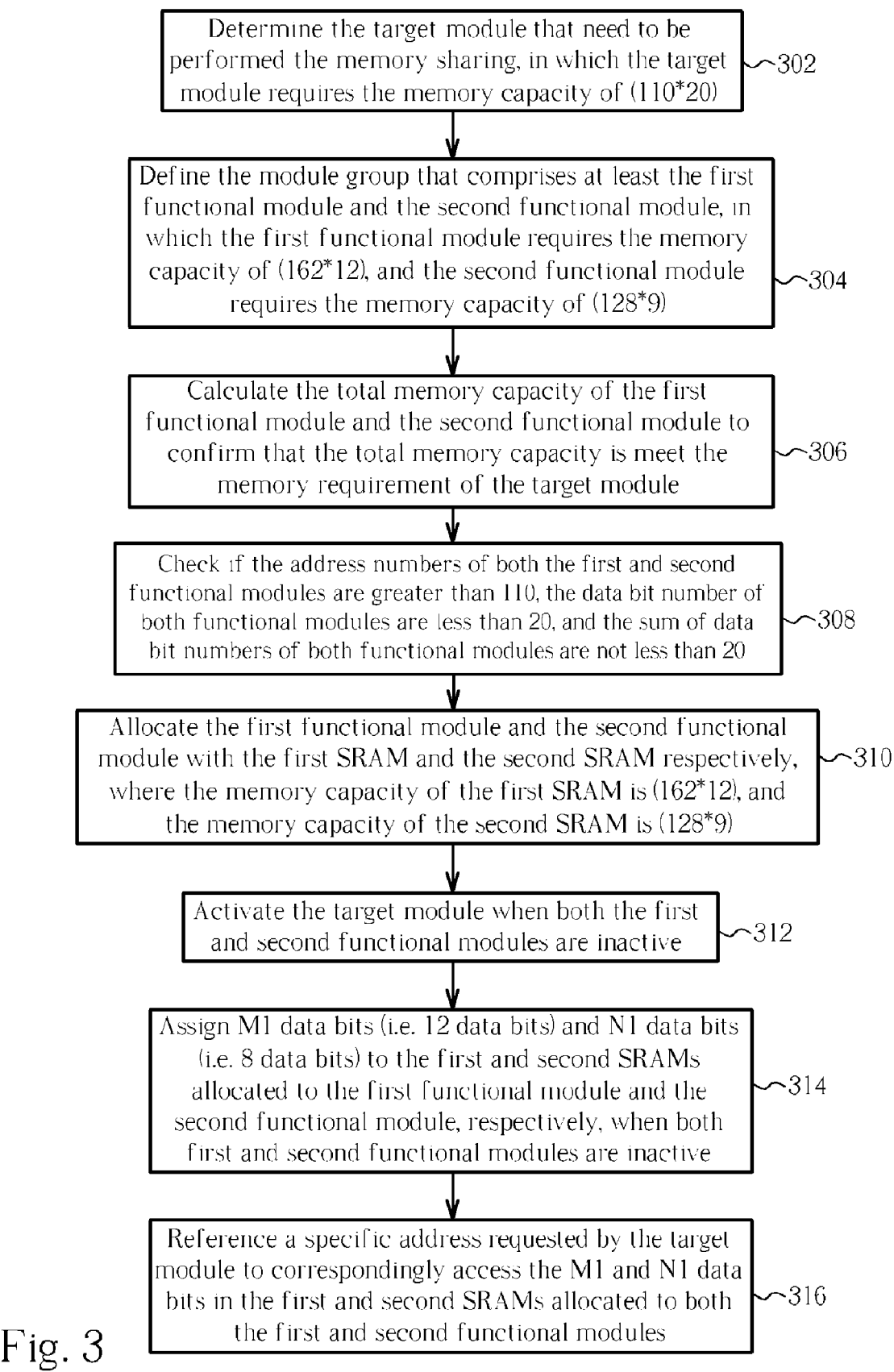
FIG. 3 is a flowchart illustrating a method for providing the memory sharing system as shown in FIG. 1.

FIG. 3 is a flowchart illustrating a method for providing the memory sharing system 100 shown in FIG. 1. Provided that substantially the same result is achieved, the steps below need not be in the exact order shown and need not be contiguous. That is, additional or other steps can be intermediate. The method comprises:

Step 302: Determine the target module 102 that need to be performed the memory sharing, in which the target module 102 requires the memory capacity of (110*20);

Step 304: Define the module group that comprises at least the first functional module 104 and the second functional module 106, in which the first functional module 104 has the memory capacity of (162*12), and the second functional module 106 has the memory capacity of (128*9);

Step 306: Calculate the total memory capacity of the first functional module 104 and the second functional module 106 to confirm that the total memory capacity meets the memory requirement of the target module 102, i.e. (162*12+128*9)≧110*20;

Step 308: Check if the address numbers of both the first and second functional modules 104, 106 are greater than 110, the data bit number of both functional modules 104, 106 are less than 20, and the sum of data bit numbers of both functional modules are not less than 20;

Step 310: Allocate the first functional module 104 and the second functional module 106 with the first static random access memory (SRAM) 110 and the second SRAM 112 respectively, where the memory capacity of the first SRAM 110 is (162*12), and the memory capacity of the second SRAM 112 is (128*9);

Step 312: Activate the target module 102 when both the first and second functional modules 104, 106 are inactive;

Step 314: Assign M1 data bits (i.e. 12 data bits) and N1 data bits (i.e. 8 data bits) to the first and second SRAMs 110, 112 allocated to the first functional module 104 and the second functional module 106, respectively, when both first and second functional modules 104, 106 are inactive; and Step 316: Reference a specific address requested by the target module 102 to correspondingly access the M1 and N1 data bits in the first and second SRAMs 110, 112 allocated to both the first and second functional modules 104, 106.

Figure 4:
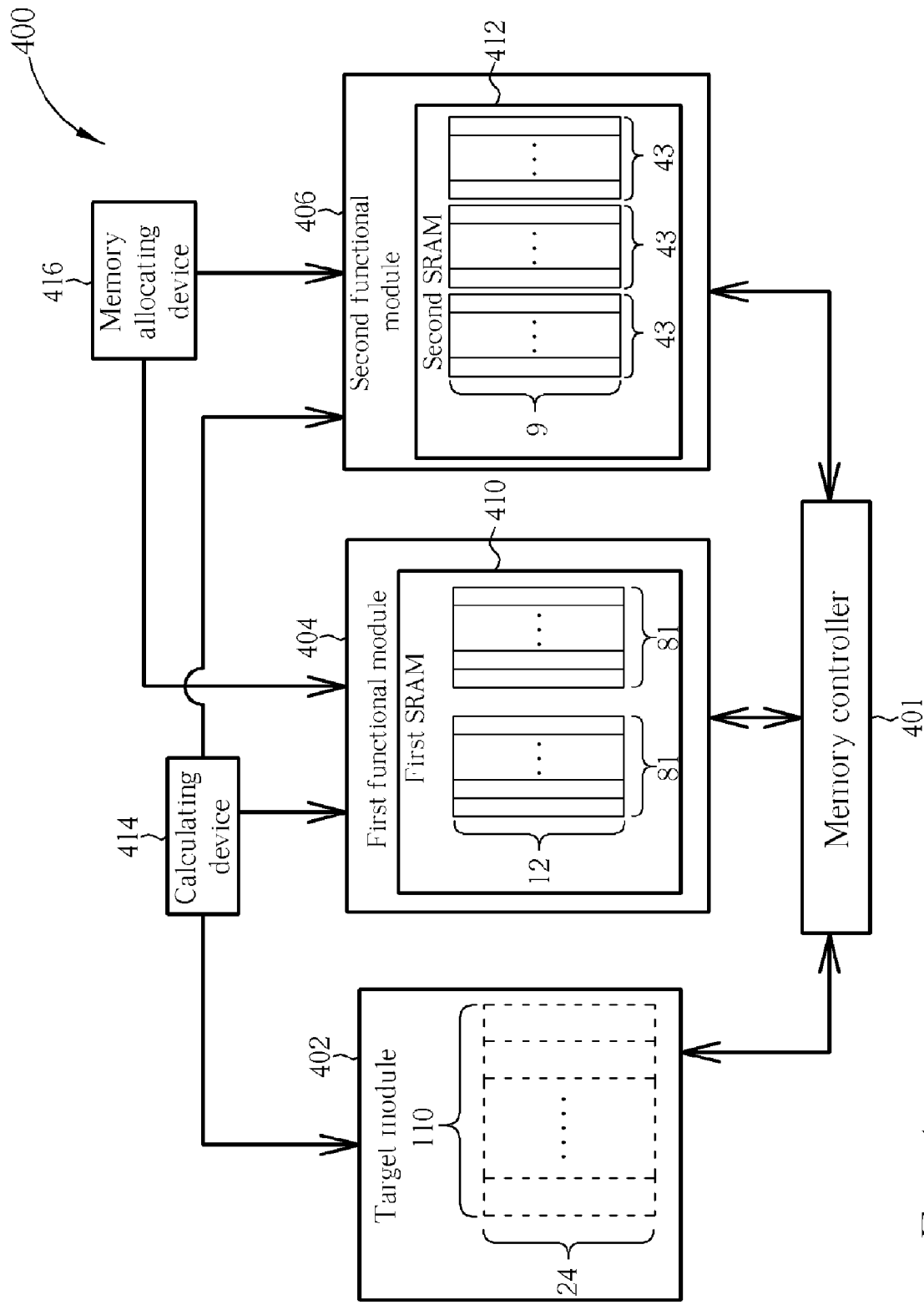
FIG. 4 is a diagram illustrating a memory sharing system for two functional modules and a target module in an SOC device according to a second embodiment of the present invention.

Please refer to FIG. 4. FIG. 4 is a diagram illustrating a memory sharing system 400 for at least a functional modules (i.e. two functional modules 404, 406 in this embodiment for brevity) and a target module 402 in an SOC device according to a second embodiment of the present invention. Similar to the first embodiment, the first functional module 404 comprises a first SRAM 410, and the second functional module 412 comprises a second SRAM 412. The memory sharing system 400 comprises a calculating device 414, a memory allocating device 416, and a memory controller 401. As the matter of fact that the calculating device 414, the memory allocating device 416, and the memory controller 401 are having the same functions with the calculating device 114, the memory allocating device 116, and the memory controller 101 of the first embodiment, the detailed description is omitted here for brevity. In this embodiment, the target module 402 has no internal SRAM assigned within, and the memory controller 401 is implemented to allow the target module 402 to share the first SRAM 410 and the second SRAM 412, respectively allocated to the first functional module 404 and the second functional module 406. Please note that the number of implemented modules and the number of SRAMS illustrated are only for exemplary purposes. More specifically, the present invention is not limited to sharing only two SRAMS with one target module. The operation of memory sharing is detailed using an example below.

Please refer to FIG. 4 again, in normal operational mode of the SOC device, the target module 402 requires a memory capacity of (110*24), while first functional module 404 requires a memory capacity of (162*12), and second functional module 406 requires a memory capacity of (128*9). The referenced values of 110, 162, and 128 are the respective address numbers, while the values 24, 12, and 9 are the respective data bit numbers. Furthermore, the target module 402, first functional module 404, and second functional module 406 are not activated simultaneously.

Similar to the first embodiment, the calculating device 414 compares the required memory capacity 110*24 of the target module 402 with the total memory capacity 162*12+128*9 of the first and second functional modules 404, 406, and obtains that the total memory capacity (162*12+128*9) is not less than the required memory capacity 110*24, i.e. (162*12+128*9)≧110*24.

Then, the calculating device 414 further calculates the address numbers and data bit numbers of both the first SRAM 410 and the second SRAM 412 respectively in order to decide a memory sharing mechanism of the present invention upon the memory sharing system 400. Since the address numbers of both the first and second functional modules 404, 406 are greater than 110, the data bit number of both functional modules 404, 406 are less than 24, and the sum of data bit numbers of both functional modules are also less than 24 (i.e. 21), which means that the data of the target module 102 can not be directly accessed to the first SRAM 110 and the second SRAM 112 when the first and second functional modules 104, 106 are not activated. However, the total memory capacity of the first and second functional modules 404, 406 conform the memory capacity of the target module 402, i.e., (162*12+128*9)≧110*24. Therefore, the allocating device 416 allocates the first SRAM 410, which is a plurality of physically separated SRAM chips and having the total memory capacity of (162*12), to the first functional module 404, and allocates the second SRAM 412, which is also a plurality of physically separated SRAM chips and having the total memory capacity of (128*9), to the second functional module 406.

The number of SRAM chips for building the first SRAM 410 is determined by performing a roundup operation, i.e. roundup to the nearest whole number, which is performed by the calculating device 414. The roundup operation depends on the value equal to the data bit number for the required memory capacity of the target module 402 (i.e., 24), divided by the data bit number for the memory capacity required by the first functional module 404 (i.e., 12). The number of SRAM chips for building the second SRAM 412 is determined by performing a roundup operation based on the value equaling the data bit number for the memory capacity required by the target module 402 (i.e., 24), divided by the data bit number of the memory capacity required by the second functional module 406 (i.e., 9).

The first SRAM 410 can therefore have a total memory capacity of (162*12), implemented by two physically separated memory chips each having a memory capacity of (81*12). They are allocated to the first functional module 404. The second SRAM 412 with a total memory capacity of (128*9), implemented by three physically separated memory chips each having a memory capacity of (43*9), is allocated to the second functional module 406. It should be noted that the sum of address number for each memory chip in the first SRAM 410 (i.e. 12) and the address number of each memory chip in the second SRAM 412 (i.e. 9) should not be less than the required address number for the target module 402. Please note that, according to the present invention, the first SRAM 410 and the second SRAM 412 are not limited in using the plurality of physically separated SRAM chips, those skilled in this art will readily to know that the first SRAM 410 can be programmably divided by the memory allocating device 416 into a virtually separated plurality of SRAM chips that having the above-mentioned memory capacity, and so to the second SRAM 412.

When both the first and second functional modules 404, 406 are inactive, the SOC device activates the target module 402, and the memory controller 401 begins to enable the memory sharing mechanism.

Figure 5:
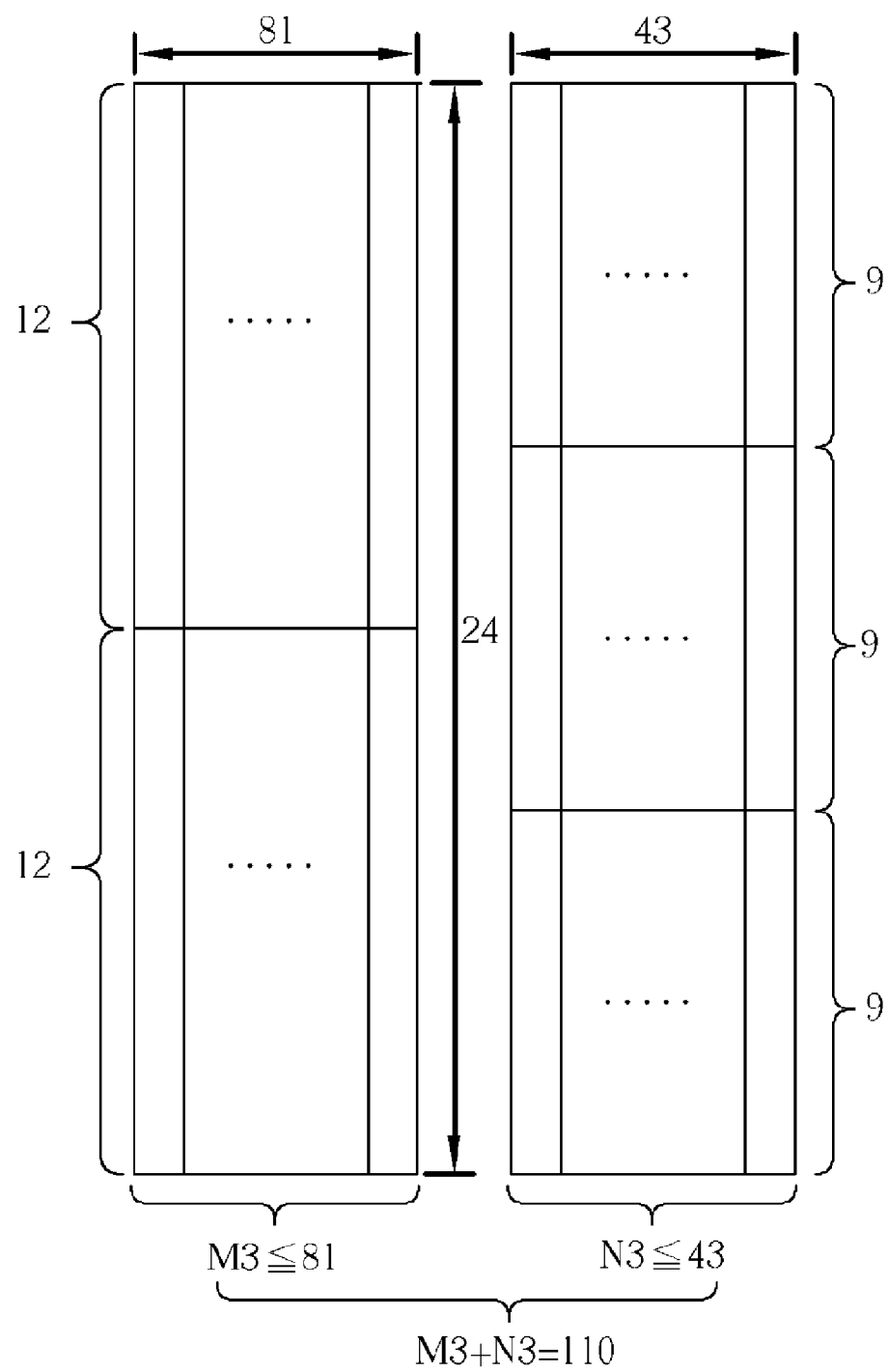
FIG. 5 is a diagram illustrating a memory sharing configuration for the target module as shown in FIG. 4.

Please refer to FIG. 5. FIG. 5 is a diagram illustrating a memory sharing configuration for the target module 402 shown in FIG. 4. Each of the first and second SRAMs 410, 412 includes a plurality of physically separated memory chips, which can be rearranged to establish the memory configuration shown in FIG. 2. In other words, the first SRAM 410 corresponds to a memory capacity of (81*24), while the second SRAM 412 corresponds to a memory capacity of (43*27). Therefore, the memory controller 401 virtually merges the first SRAM 410 and the second SRAM 412 to provide a suitable memory capacity required by the target module 402. In this embodiment, the memory controller 401 assigns M3 addresses (e.g. 81) to the first SRAM 410 and N3 addresses (e.g. 29) to the second SRAM 412, where the sum of M3 and N3 (i.e, M3+N3) is equal to 110. It should be noted that depending on design requirements, the values of M3 and N3 are programmable, as well as the addresses selected for sharing with target module 402. In other words, under the condition of M3+N3=110, any M3 addresses can be chosen out of the first SRAM 410 of the first functional module 404 and any N3 addresses can be chosen out of the second SRAM 412 of the second functional module 406 as shown in FIG. 5. When receiving a specific address requested by the target module 402, the memory controller 401 references the specific address for the desired 24 data bits by accessing either the first SRAM 410 or the second SRAM 412. As a result, the target module 402, despite having no internally allocated SRAM, can perform normal operation through the memory sharing mechanism.

Figure 6:
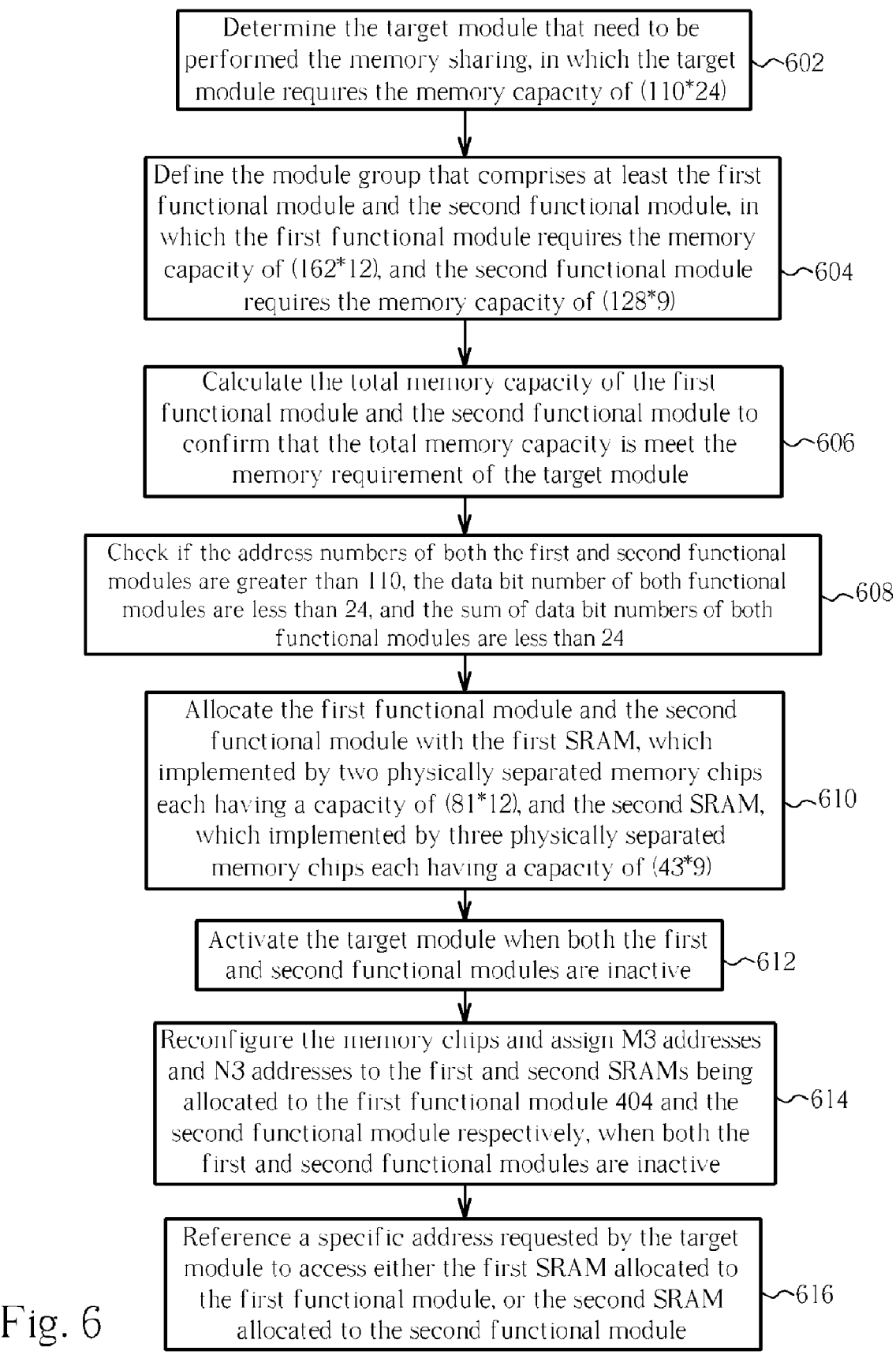
FIG. 6 is a flowchart illustrating a method for providing the memory sharing system as shown in FIG. 4.

FIG. 6 is a flowchart illustrating a method for providing the memory sharing system 400 shown in FIG. 4. Provided that substantially the same result is achieved, the steps below need not be in the exact order shown and need not be contiguous. That is, other steps can be intermediate. The method comprises:

Step 602: Determine the target module 402 that need to be performed the memory sharing, in which the target module 402 requires the memory capacity of (110*24);

Step 604: Define the module group that comprises at least the first functional module 404 and the second functional module 406, in which the first functional module 404 requires the memory capacity of (162*12), and the second functional module 406 requires the memory capacity of (128*9); Step 606: Calculate the total memory capacity of the first functional module 404 and the second functional module 406 to confirm that the total memory capacity is meet the memory requirement of the target module 402, i.e. (162*12+128*9)≧110*24;

Step 608: Check if the address numbers of both the first and second functional modules 404, 406 are greater than 110, the data bit number of both functional modules 104, 106 are less than 24, and the sum of data bit numbers of both functional modules are less than 24;

Step 610: Perform a roundup operation in order to allocate the first functional module 404 and the second functional module 406 with the first SRAM 410, which implemented by two physically separated memory chips each having a capacity of (81*12), and the second SRAM 112, which implemented by three physically separated memory chips each having a capacity of (43*9), where the target module 402 requires a memory capacity of (110*24), the first functional module 404 requires a memory capacity of (162*12), and the second functional module 406 requires a memory capacity of (128*9);

Step 612: Activate the target module 102 when both the first and second functional modules 104, 106 are inactive;

Step 614: Reconfigure the memory chips and assign M3 addresses and N3 addresses to the first and second SRAMs 410, 412 being allocated to the first functional module 404 and the second functional module respectively, when both the first and second functional modules 404, 406 are inactive;

Step 616: Reference a specific address requested by the target module 402 to access either the first SRAM 410 allocated to the first functional module 404, or the second SRAM 412 allocated to the second functional module 406.

When the target data associated with the specific address of the memory capacity is requested by the target module 402, and the target module 402 is designed to loose timing constraints, the memory controller 401 is allowed to reference the specific address to access the SRAM device associated with the specific address via a plurality of cycles. For example, in response to a target module 402 request, the memory controller 401 is capable of accessing the first SRAM module 410 in two cycles to obtain the required 24 data bits in one of the first 81 addresses, and can access the second SRAM module 412 in three cycles to obtain the required 24 data bits in the remaining 29 addresses.

Figure 7:
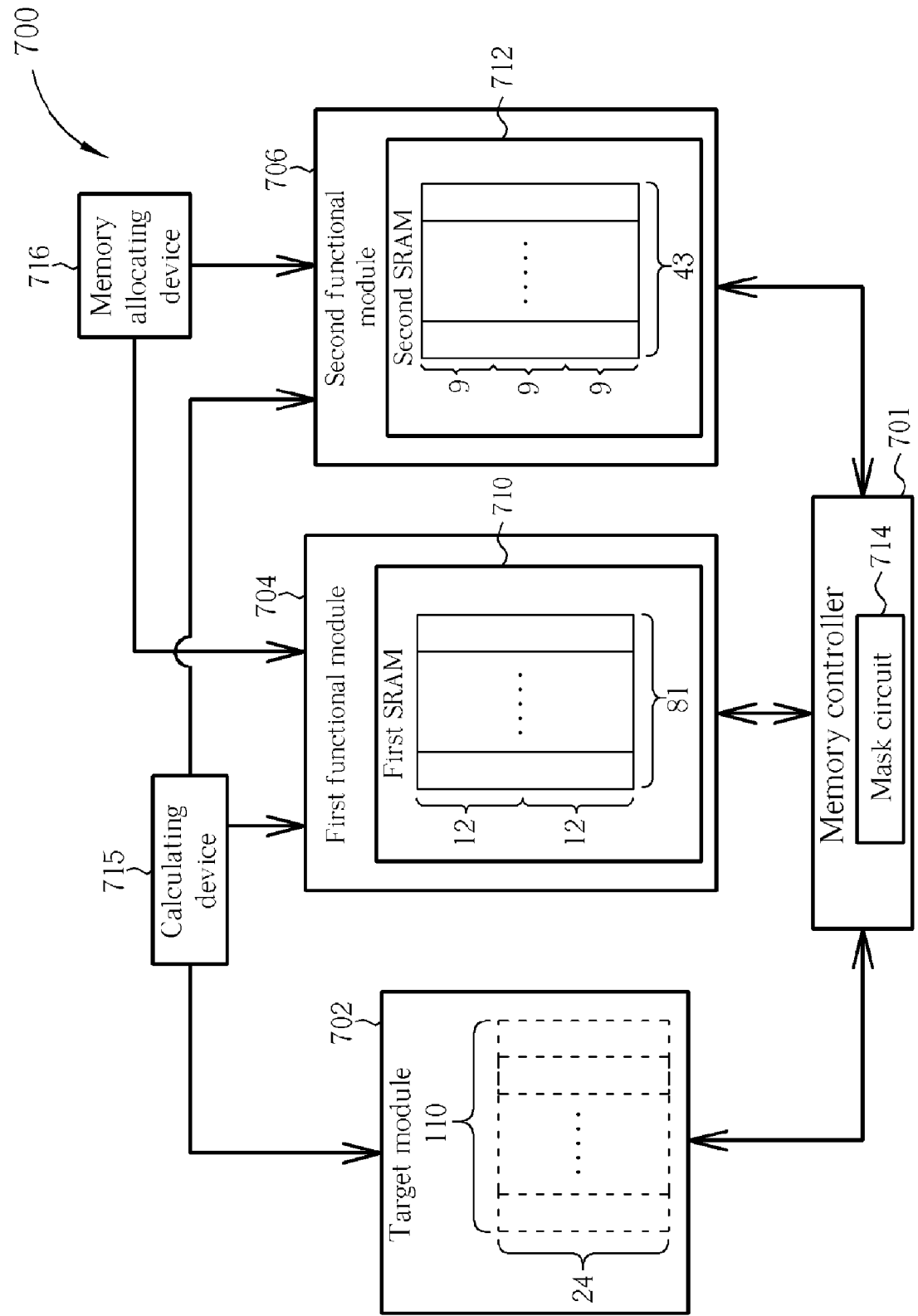
FIG. 7 is a diagram illustrating a memory sharing system for two functional modules and a target module in an SOC device according to a third embodiment of the present invention.

Please refer to FIG. 7. FIG. 7 is a diagram illustrating a memory sharing system 700 for at least a functional modules (i.e. two functional modules 704, 706 in this embodiment for brevity) and a target module 702 in an SOC device according to a third embodiment of the present invention. The first functional module 704 comprises a SRAM 710, and the second functional module 706 comprises a SRAM 712. The memory sharing system 700 comprises a calculating device 715, a memory allocating device 716, and a memory controller 701. As the matter of fact that the calculating device 715, the memory allocating device 716, and the memory controller 701 are having the same functions with the calculating device 114, the memory allocating device 116, and the memory controller 101 of the first embodiment, thus the detailed description is omitted here for brevity. In this embodiment, the target module 702 has no internal SRAM assigned within, and the memory controller 701 is implemented to allow the target module 702 to share the first SRAM 710 and the second SRAM 712, respectively allocated to first functional module 704 and second functional module 706. Please note that the number of implemented modules and the number of SRAMS illustrated are only for exemplary purposes. More specifically, the present invention is not limited to sharing only two SRAMS with one target module. The operation of memory sharing is detailed using an example below.

The memory capacity requirement of the SOC device is substantially the same as the above-mentioned second embodiment as shown in FIG. 4, therefore the calculating operation of the calculating device 715 is omitted for brevity. However, in this embodiment, the memory allocating device 716 only allocates a single memory chip to establish the first SRAM 710, allocates another single memory chip to establish the second SRAM 712. To the first SRAM 710, the single memory chip of the memory capacity (81*24) is regarded as two read/write blocks each having a memory capacity (81*12), where the determination of the read/write blocks follows the rule applied to above-mentioned second embodiment. Similarly, to second SRAM 712, the single memory chip of the memory capacity (43*27) is regarded as three read/write blocks each having a memory capacity (43*9). The total number of data bits for the first SRAM 710, and the total number of data bits for second SRAM 712 are 24 and 27 respectively, as shown in FIG. 7. This is equal or greater than the required data bit number, 24, of target module 702. Furthermore, the total number of addresses of the first and second SRAMs 710, 712 is 124, which is greater than the required number of addresses, 110, of target module 702. The overall chip size of the two memory chips each having the memory capacity (81*12) is greater than that of a single memory chip of the memory capacity (81*24). Therefore, the third embodiment provides a more cost-efficient solution when compared with the third embodiment.

Figure 8:
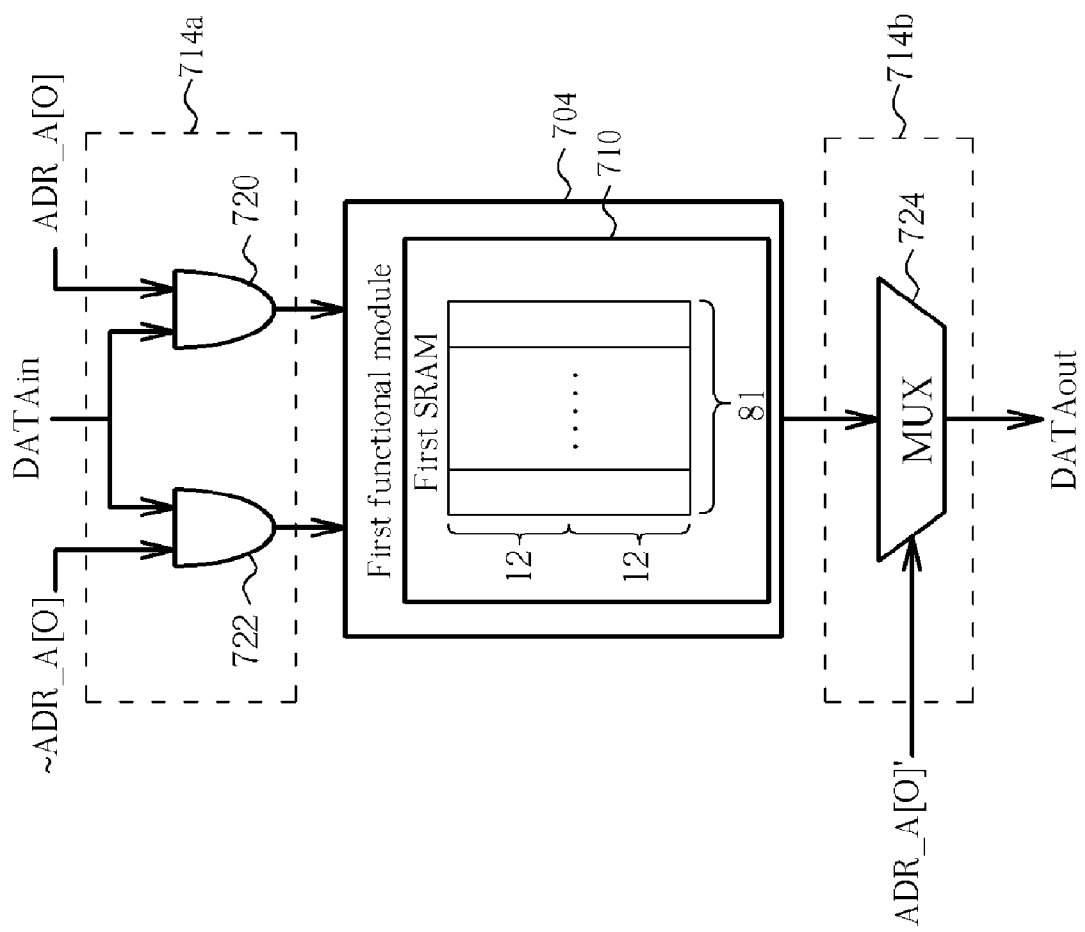
FIG. 8 is a diagram of the mask device as shown in FIG. 7.

On the other hand, when the target module 702 is inactivated, and the first functional module 704 or the second functional module 706 is activated (e.g. the first functional module 704 is activated), the first SRAM 710 within the first functional module 704 needs to be accessed by the first functional module 704. However, as the matter of fact that the first SRAM 710 having the memory capacity of (81*12) but not (162*24), therefore a masking mechanism should be used in the memory sharing system 700. Accordingly, in order to make the first and second functional modules 704, 706 correctly access the respective first and second SRAMs 710, 712, a mask device 714 is utilized. FIG. 8 is a diagram of the mask device 714 as shown in FIG. 7. Please note that, even the mask device 714 that shown in FIG. 7 is masking the first functional module 704, this is just an example of the present invention. In other words, the mask device 714 is used for referencing the first and second SRAMs 710, 712 of the functional modules 704, 706 when a required data bits with a specific address are requested by the functional modules 704, 706, respectively. The mask device 714 comprises a write-masking device 714a and a read-masking device 714b. The write-masking device is utilized for masking the first and/or second SRAMs by utilizing at least a lowest bit of the specific address to write the required data bits into the first and second SRAMs; and the read-masking device 714b is utilized for masking the first and/or second SRAMs by utilizing at least a lowest bit of the specific address in order to read the required data bits from the first and second SRAMs by the memory controller 701. The implementation will be described in detail in the following paragraph.

In one embodiment, two AND gates 720 and 722 act as the write-masking device 714a, and the 2-to-1 multiplexer 724 serves as the read-masking device 714b. The first AND gate 720 has a first input terminal coupled to the lowest bit of the specific address, and has a second input terminal coupled to the required data bits, and has an output terminal coupled to the first and second SRAMs 710, 712. The second AND gate 722 has a first input terminal coupled to the inversed lowest bit of the specific address, has a second input terminal coupled to the required data bits, and has an output terminal coupled to the first and second SRAMs 710, 712.

Figure 9:
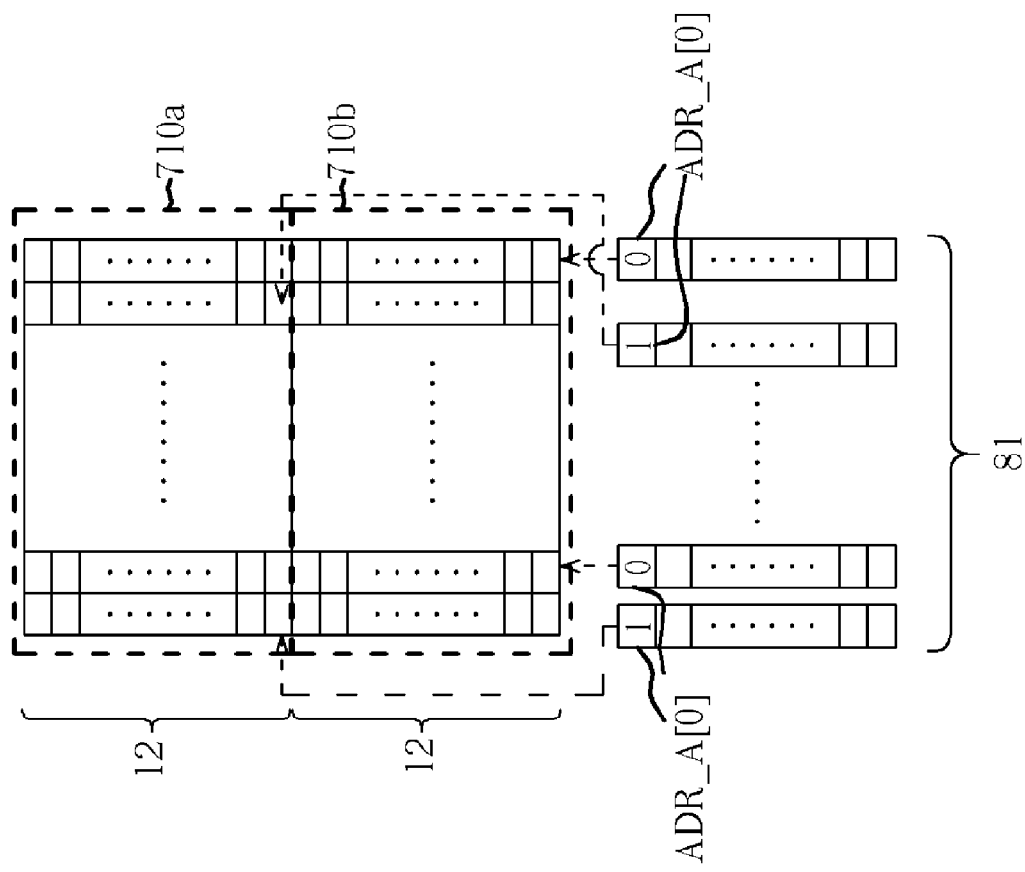
FIG. 9 is a diagram illustrating the data writing of the first functional module by utilizing the write-masking device of the embodiment as shown in 7.

When the first functional module 704 writes data DATAin into the first SRAM 710, in which the data DATAin is a 12 bits data and has an address ADR, then the lowest bit ADR_A[0] of the address ADR is inputted to the first input terminal the first AND gate 720, and the inverse of the lowest bit~ADR_A[0] of the address ADR is inputted to the first input terminal the second AND gate 722. Therefore, one of the first AND gate 720 or the second AND gate 722 is turned on when the data DATAin is wrote into the first SRAM 710. Please refer to FIG. 9, FIG. 9 is a diagram illustrating the data writing of the first functional module 704 by utilizing the write-masking device 714a of the present invention. For simplicity, only the circuit components applied to the first functional module 704 are shown in FIG. 8 and FIG. 9. However, the mask device 714 further contains similar circuit components (not shown) applied to the second functional module 706. When the first functional module 704 is in operation, the corresponding write-masking device 714a is used to mask either the top half or bottom half of 24 data bits (i.e. the portions 710a, 710b as shown in FIG. 9) according to the lowest one address bit ADR_A[0] to write the input data DATAin into the proper position of the first SRAM 710. Therefore, from the perspective of the first functional module 704, the first SRAM 710 is equivalent to an SRAM of the memory capacity (162*12) with the help of write mark. As an example, please refer to FIG. 9, when the first functional module 704 writes to the first SRAM 710, if the lowest bit of an address ADR_A[0] associated with a write request is one, the corresponding 12-bit data in the top half of 24 data bits will be written in first 12 data bits (i.e. the portion 710a) corresponding to the address. However, if the lowest bit of the address is zero, the 12-bit data in the bottom half of 24 data bits will be written in the last 12 data bits (i.e. the portion 710b) corresponding to the address.

Figure 10:
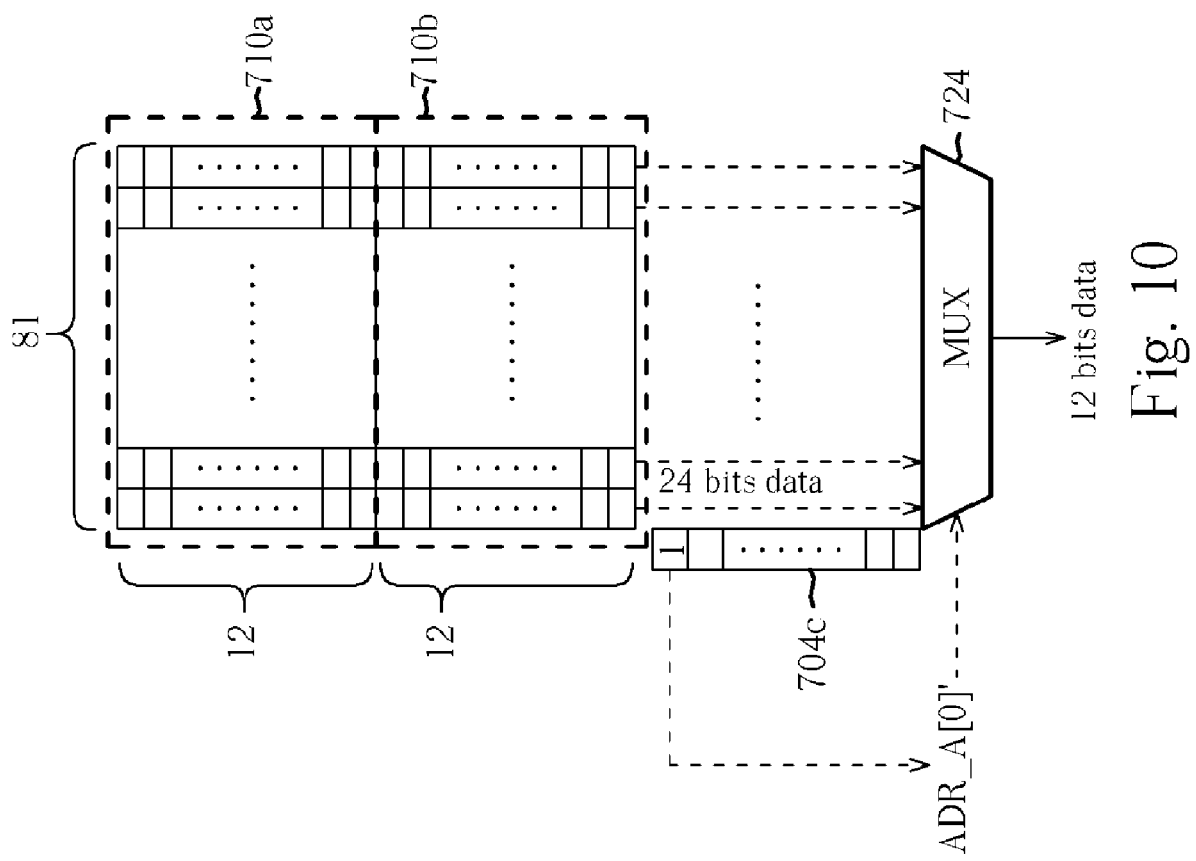
FIG. 10 is a diagram illustrating the date reading of the first functional module by utilizing the read-masking device of the embodiment as shown in FIG. 7.

On the other hand, when the first functional module 704 reads data DATAout with an address ADR from the first SRAM 710, in which the data DATAout is a 12 bits data, however the data that outputted by the first SRAM 710 is 24 bits, therefore the lowest bit ADR_A[0]' of the address ADR is inputted to the MUX 724. The lowest bit ADR_A[0]' decides the MUX 724 to output the required 12 bits data of the data DATAout as shown in FIG. 10. FIG. 10 is a diagram illustrating the data reading of the first functional module 704 by utilizing the read-masking device 714b of the present invention. For the read-masking device 714b, it selects either top half or bottom half of 24 data bits as output data DATAout according to the lowest one address bit ADR_A[0]' associated with a read request. Please refer to FIG. 10, when first functional module 704 reads the first SRAM 710, the whole 24 data bits corresponding to an address 704c associated with a read request will be read out from the first SRAM 710. Similarly, the whole 24 data bits are outputted from the portion 710a and portion 710b as shown in FIG. 10. If the lowest bit ADR_A[0]' of the associated address is one, the MUX 724 will output the first 12 data bits according to the address from the top half of the 24 data bits in the portion 710a. If the lowest bit ADR_A[0]' of the associated address in zero, the MUX 724 will output the last 12 data bits from the bottom half of 24 data bits in the portion 710b. Please note that, the present invention is not limited in utilizing the lowest bit of the associated address to determine which portions is going to be accessed. Similarly, the second functional module 706 also utilizes the write-masking device 714a and the read-masking device 714b to access the second SRAM 712, where the write-masking device 714a references the lowest two address bits to write the input 9-bit data into one of the high, middle, and low 9 data bits, and the read-masking device 714b references lowest two address bits to select one of the high, middle, and low 9 data bits for output data. However, when both the first and second functional modules 704, 706 are inactive, the SOC device activates the target module 702 and the memory controller 701, and then enables the memory sharing mechanism. Similarly, the present invention is not limited in utilizing the lowest two bits of the associated address to determine which portions is going to be accessed.

Figure 11:
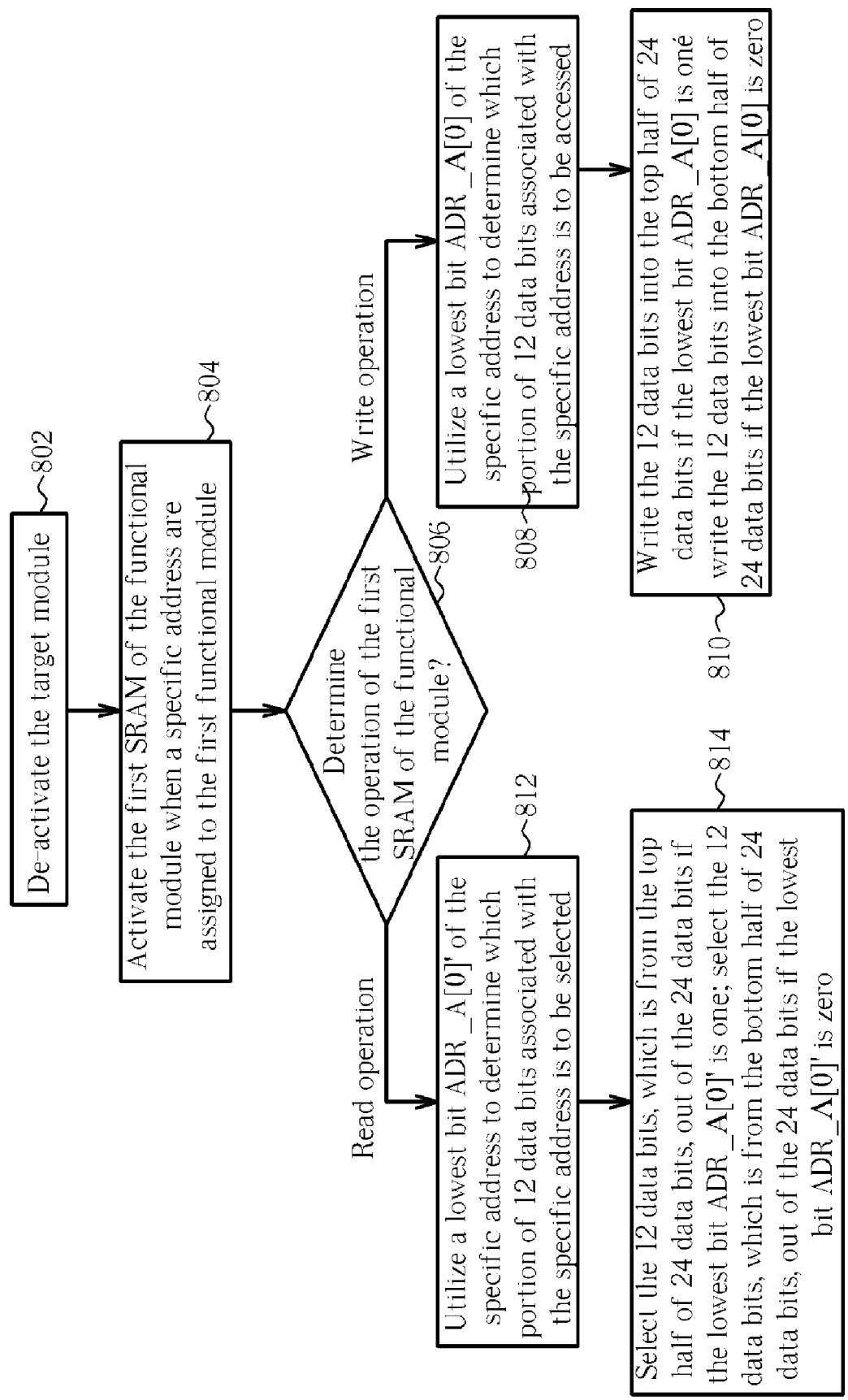
FIG. 11 is a flowchart illustrating a method for accessing the first SRAMs of the first functional module by through the mask device of the present invention.

FIG. 11 is a flowchart illustrating a method for accessing the first SRAMs 710 of the first functional module 704 by through the mask device 714 of the present invention. For simplicity, the method that shown in FIG. 11 only being the accessing of the first SRAMs 710 of the first functional module 704, however, those skilled in this art are readily to know that the method also applied to the second functional module 706 through some appropriated modification. Provided that substantially the same result is achieved, the steps below need not be in the exact order shown and need not be contiguous. That is, other steps can be intermediate. The method comprises:

Step 802: De-activate the target module 702;

Step 804: Activate the first SRAM 710 of the functional module 704 when a specific address are assigned to the first functional module 704;

Step 806: Determine the operation of the first SRAM 710 of the functional module 714, if a required data bits of the specific address need to be write into the first SRAM 710, go to step 808; if data bits corresponds to the specific address need to be read from the first SRAM 710, go to step 812;

Step 808: Utilize a lowest bit ADR_A[0] of the specific address to determine which portion of 12 data bits associated with the specific address is to be accessed;

Step 810: Write the 12 data bits into the top half of 24 data bits (i.e. the portion 710a) if the lowest bit ADR_A[0] is one; write the 12 data bits into the bottom half of 24 data bits (i.e. the portion 710b) if the lowest bit ADR_A[0] is zero;

Step 812: Utilize a lowest bit ADR_A[0]' of the specific address to determine which portion of 12 data bits associated with the specific address is to be selected;

Step 814: Select the 12 data bits, which is from the top half of 24 data bits (i.e. the portion 710a), out of the 24 data bits if the lowest bit ADR_A[0]' is one; select the 12 data bits, which is from the bottom half of 24 data bits (i.e. the portion 710a), out of the 24 data bits if the lowest bit ADR_A[0]' is zero.

Similarly, for the case of accessing the second functional module 706, the method of the present invention references the lowest two address bits to write the input 9-bit data into one of the high, middle, and low 9 data bits, and references lowest two address bits to select one of the high, middle, and low 9 data bits for output data.

It should be noted that, although the above-mentioned embodiments are described in the situation that the target module and the functional modules do not activated at the same time, this is not be the limitation of the present invention. In other words, the target module and some of the functional modules can be activated at the same time. Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory sharing method for a plurality of functional modules and a target module, each functional module comprising at least a static random access memory (SRAM), the memory sharing method comprising:
   (a) calculating a memory capacity of the plurality of functional modules;
   (b) if a total memory capacity of a module group satisfies a memory capacity requirement of the target module, allocating SRAMs of the module group, wherein the module group comprises the functional modules; and
   (c) accessing the SRAMs of the plurality of functional modules of the module group by utilizing the target module,
   wherein the memory capacity requirement of the target module is a product of an address number X and a bit number Y, the number of functional modules within the module group is m, the number of physically separated SRAM within the module group is n, an $i^{th}$ SRAM has an address number $X_i$ and a bit number $Y_i$, the memory capacity of the $i^{th}$ SRAM is a product of $X_i$ and $Y_i$, and $i \leq n$,
   wherein when each address number $X_i$, where $i=1\sim n$, is not less than X and a sum of each bit number $Y_i$, where $i=1\sim n$, is not less than Y, the step (b) comprises:
   allocating a portion of at least one of the $i^{th}$ SRAM as an allocated SRAM that with a bit number $Y_{i\_first}$ and the address number X to meet the memory capacity requirement of the target module, where a sum of each bit number $Y_{i\_first}$ is equal to Y and $i \leq n$.

2. The memory sharing method of claim 1, wherein the target module and the plurality of functional modules are not activated concurrently.

3. The memory sharing method of claim 1, wherein the module group further comprises the target module.

4. The memory sharing method of claim 1, wherein when a target data with a specific address is selected by the target module, allocated SRAMs corresponding to the specific address are selected.

5. The memory sharing method of claim 1, wherein the step (b) comprises:
   re-allocating each $i^{th}$ SRAM into $n_i$ allocated SRAMs, each of the $n_i$ allocated SRAMs has a bit number $Y_{ij}$ and an address number $X_{i\_first}$ equal to $X_i/n_i$, where $i=1\sim n$, $j=1\sim n_i$, at least one of $n_i$ is greater than two, a sum of each bit number $Y_{ij}$ of each $i^{th}$ SRAM is not less than Y, and a sum of each address number $x_{i\_first}$ is not less than X.

6. The memory sharing method of claim 1, wherein the step (b) comprises:
   distributing each $i^{th}$ SRAM into $n_i$ distributed SRAMs, each of the $n_i$ distributed SRAMs has a bit number $Y_{ij}$ and an address number $X_{i\_first}$ equal to $X_i/n_i$, where $i=1\sim n$, $j=1\sim n_i$, at least one of $n_i$ is greater than two, a sum of each bit number $Y_{ij}$ of each $i^{th}$ SRAM is not less than Y, and a sum of each address number $X_{i\_first}$ is not less than X.

7. The memory sharing method of claim 5, wherein each address number $X_i$ is not less than X and a sum of each bit number $Y_i$ is less than Y.

8. The memory sharing method of claim 5, wherein each bit number $Y_{ij}$ of the $n_i$ allocated SRAMs has the same value.

9. The memory sharing method of claim 5, wherein the $n_i$ allocated SRAMs are physically separated.

10. The memory sharing method of claim 6, wherein when a target data with the bit number Y and a specific address is selected by the target module, allocated SRAMs within a specific SRAM are selected according to the specific address, and the target data is read in one cycle.

11. The memory sharing method of claim 6, wherein when a target data with the bit number Y and a specific address is selected by the target module, at least one of allocated SRAMs within a specific SRAM is selected according to the specific address, a portion of the target data is read in one cycle, and the target data is obtained by combining a plurality of portions of the target data read in a plurality of cycles, respectively.

12. The memory sharing method of claim 1, wherein the memory capacity requirement of the target module is the product of the address number X and the bit number Y, the number of functional modules within the module group is m, each SRAM within each functional module is physically separated, an $i^{th}$ SRAM has the address number $X_i$ and the bit number $Y_i$, and the memory capacity of the $i^{th}$ SRAM is the product of $X_i$ and $Y_i$, $Y_i \geq Y$, $X_i < X$, a sum of the memory capacity of all allocated SRAMs of the module group is not less than the memory capacity requirement of the target module, and the step (b) comprises:
   allocating each $i^{th}$ SRAM into $n_i$ allocated SRAMs, where each of the $n_i$ allocated SRAMs has a bit number Y and an address number $X_{i\_used}$, and a sum of each address number $X_{i\_used}$ of the $i^{th}$ SRAM is not less than X.

13. The memory sharing method of claim 12, wherein the $n_i$ allocated SRAMs are integrated on a single SRAM.

14. The memory sharing method of claim 12, wherein when a target data with a specific address is selected by the target module, allocated SRAMs corresponding to the specific address are selected and the selected allocated SRAMS are accessed according to respective target bit numbers.

15. The memory sharing method of claim 14, further comprising:
   activating the SRAM of at least one functional module of the module group; and
   when required data bits with a specific address are requested by the activated functional module, referencing the specific address to access an activated SRAM of the activated functional module.

16. The memory sharing method of claim 15, wherein the step of referencing the specific address to access the activated SRAM of the activated functional module further comprises:
   utilizing at least a lowest bit of the specific address to determine which portion of data bits associated with the specific address is to be accessed.

17. A memory sharing method for at least a functional module and a target module, the functional module comprising at least a static random access memory (SRAM), the memory sharing method comprising:

calculating a memory capacity of the functional module;

if a total memory capacity of a module group satisfies a memory capacity requirement of the target module, allocating the SRAM of the module group, wherein the module group comprises at least one functional module; and accessing the SRAM of the functional module of the module group by utilizing the target module;

wherein the memory capacity requirement of the target module is a product of an address number X and a bit number Y, the number of functional modules within the module group is m, the number of physically separated SRAM within the module group is n, an $i^{th}$ SRAM has an address number $X_i$ and a bit number $Y_i$, the memory capacity of the $i^{th}$ SRAM is a product of $X_i$ and $Y_i$, and $i \leq n$, wherein when each address number $X_i$, where i=1~n, is not less than X and a sum of each bit number $Y_i$, where i=1~n, is not less than Y, the step (b) comprises:

allocating a portion of at least one of the $i^{th}$ SRAM as an allocated SRAM that with a bit number $Y_{i\_first}$ and the address number X to meet the memory capacity requirement of the target module, where a sum of each bit number $Y_{i\_first}$ is equal to Y and $i \leq n$.

18. A memory sharing system for at least a functional module and a target module, the functional module comprising at least a static random access memory (SRAM), the memory sharing system comprising:

a calculating device calculating a memory capacity of the functional module;

a memory allocating device allocating the SRAM of a module group if a total memory capacity of the module group satisfies a memory capacity requirement of the target module, wherein the module group comprises at least one functional module; and a memory controller, arranged to access the SRAM of the functional module of the module group by utilizing the target module;

wherein the memory capacity requirement of the target module is a product of an address number X and a bit number Y, the number of functional modules within the module group is m, the number of physically separated SRAM within the module group is n, an $i^{th}$ SRAM has an address number $X_i$ and a bit number $Y_i$, the memory capacity of the $i^{th}$ SRAM is a product of $X_i$ and $Y_i$, and $i \leq n$, wherein when each address number $X_i$, where i=1~n, is not less than X and a sum of each bit number $Y_i$ where i=1~n, is not less than Y, the step comprises:

allocating a portion of at least one of the $i^{th}$ SRAM as an allocated SRAM that with a bit number $Y_{i\_first}$ and the address number X to meet the memory capacity requirement of the target module, where a sum of each bit number $Y_{i\_first}$ is equal to Y and $i \leq n$.

* * * * *